US012412468B2

(12) United States Patent
Vasisht et al.

(10) Patent No.: US 12,412,468 B2
(45) Date of Patent: Sep. 9, 2025

(54) RADIO FREQUENCY-BASED CROWD ANALYTICS

(71) Applicant: Microsoft Technology Licensing, LLC, Redmond, WA (US)

(72) Inventors: Deepak Vasisht, Champaign, IL (US); Manikanta Kotaru, Kenmore, WA (US); Nissanka Arachchige Bodhi Priyantha, Redmond, WA (US); Ranveer Chandra, Kirkland, WA (US); Jiaming Wang, Urbana, IL (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 966 days.

(21) Appl. No.: 17/492,467

(22) Filed: Oct. 1, 2021

(65) Prior Publication Data
US 2023/0103432 A1  Apr. 6, 2023

(51) Int. Cl.
*G06N 3/08* (2023.01)
*G08G 1/01* (2006.01)
*G06Q 30/0201* (2023.01)

(52) U.S. Cl.
CPC ............. *G08G 1/0108* (2013.01); *G06N 3/08* (2013.01); *G08G 1/0141* (2013.01); *G06Q 30/0201* (2013.01)

(58) Field of Classification Search
CPC .... G08G 1/0108; G06N 3/08; G06Q 30/0201; G01S 13/34; G01S 13/42; G01S 13/87; G01S 13/89
See application file for complete search history.

(56) References Cited

U.S. PATENT DOCUMENTS

| | | | | |
|---|---|---|---|---|
| 6,035,057 A | * | 3/2000 | Hoffman | G06V 20/13 382/156 |
| 8,928,524 B1 | * | 1/2015 | Nunn | G01S 13/106 342/134 |
| 11,726,184 B2 | * | 8/2023 | Ferreira | G01S 7/4815 356/4.01 |
| 2014/0201126 A1 | * | 7/2014 | Zadeh | A61B 5/165 706/52 |
| 2016/0132768 A1 | * | 5/2016 | Ray | G06N 3/08 706/22 |

(Continued)

OTHER PUBLICATIONS

Stephan, et al., "Radar-Based Human Target Detection Using Deep Residual U-Net For Smart Home Applications", In Proceedings of 18th IEEE International Conference On Machine Learning And Applications, Dec. 16, 2019, pp. 175-182. (Year: 2019).*

(Continued)

*Primary Examiner* — Phenuel S Salomon
(74) *Attorney, Agent, or Firm* — CALFEE, HALTER & GRISWOLD LLP (57) ABSTRACT

A deployment of sensors transmit radio frequency (RF) signals into an area of interest. The radar maps are generated from the reflected signals, including a static radar map and a dynamic radar map. Multipath and radar sidelobes are removed from the radar maps using a neural network to produce a density map. The neural network can be trained in two phases: a training phase that uses training data from a training site and a transfer learning phase that uses training data from the area of interest.

20 Claims, 10 Drawing Sheets

(56) References Cited

U.S. PATENT DOCUMENTS

| | | | | |
|---|---|---|---|---|
| 2017/0132335 | A1* | 5/2017 | Pechberti | G06F 30/20 |
| 2018/0060725 | A1* | 3/2018 | Groh | G06N 3/045 |
| 2018/0192919 | A1* | 7/2018 | Nakayama | A61B 5/1116 |
| 2019/0266301 | A1* | 8/2019 | Abbosh | G06F 30/23 |
| 2021/0255300 | A1* | 8/2021 | Harrison | G01S 13/931 |

OTHER PUBLICATIONS

Gennarelli, et al., "Multiple Extended Target Tracking For Through-Wall Radars", In Journal of IEEE Transactions on Geoscience and Remote Sensing, vol. 53, Issue 12, Dec. 1, 2015, pp. 6482-6494.

Jia, et al., "Multipath Ghost And Side/Grating Lobe Suppression Based On Stacked Generative Adversarial Nets In Mimo Through-Wall Radar Imaging", In Journal of IEEE Access, vol. 7, Oct. 11, 2019, pp. 143367-143380.

"International Search Report and Written Opinion Issued in PCT Application No. PCT/US22/039229", Mailed Date: Nov. 16, 2022, 17 Pages.

Stephan, et al., "Radar-Based Human Target Detection Using Deep Residual U-Net For Smart Home Applications", In Proceedings of 18th IEEE International Conference On Machine Learning And Applications, Dec. 16, 2019, pp. 175-182.

"Through-Wall 3D Tracking Using Body Radio Reflections", Retrieved from: https://web.archive.org/web/20210324130436/http://witrack.csail.mit.edu/, Mar. 24, 2021, 3 Pages.

Oh, et al., "Crowd Counting with Decomposed Uncertainty", In Repository of arXiv:1903.07427v3, Apr. 22, 2020, 16 Pages.

Zhang, et al., "Single-Image Crowd Counting via Multi-col. Convolutional Neural Network", In Proceedings of the IEEE conference on computer vision and pattern recognition, Jun. 27, 2016, pp. 589-597.

\* cited by examiner

RADIO FREQUENCY-BASED CROWD ANALYTICS

BACKGROUND

Crowd analytics is an important consideration for public indoor spaces like retail stores. The goal of crowd analytics is to identify locations of individuals as they walk around public spaces. This is beneficial not just for traditional applications like analytics of customer shopping behavior in retail stores, but also for recent public safety applications like contact-tracing. This information not only covers the overall shopping interest in certain areas (or corresponding goods), but also can form flow-maps across time which reveals individual behaviors and foresees potential profits based on personalized recommendations. In addition, crowd analytics have important value in social distancing applications, such as epidemics. Airborne transmission can be efficiently suppressed if crowd analytic systems can detect and alert the short distances between people.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Most crowd analytic solutions today rely on camera images, but there are key drawbacks to these solutions. First, camera view is limited by line of sight; e.g., cameras cannot see through obstacles. Visual occlusions can result in the loss of targets in camera-based analytics, which means that retail stores either need to deploy a lot of cameras or accept partial coverage where customer behavior analytics is error-prone. Second, cameras are not designed for distance measurements. Since distanced objects look small while near ones look big, accurate measurements should take into consideration the shrinking of humans on the image compared to their exact size. Also, camera-based analytics present potential privacy issues. Facial recognition has already revealed severe concerns about privacy implications; retailers are worried about privacy implications of camera based solutions.

The present disclosure presents a radio frequency (RF) based crowd analytics solution. In accordance with some embodiments, a device emits RF signals. These signals can penetrate obstacles and are reflected off human bodies. As human bodies move in the environment, the RF reflections change with time. These changes can be precisely measured using an RF sensor placed in the environment. By measuring these RF reflections, we can create a heatmap of where humans are in an environment. Such a system alleviates many challenges associated with camera-based systems: (a) the system can operate in non-line of sight: radio signals can travel through obstacles like shelf separators in retail stores and hence have a large coverage with a single device; (b) it can accurately measure distances—distance accuracy is dependent on the bandwidth of the signal. Present-day RF sensing systems can operate at a bandwidth of 2 to 4 GHz, which corresponds to a distance measurement accuracy of 7.5 to 15 cm; (c) the system does not reveal identifying features of humans (e.g. face) since it just collects reflections off the body which are coarse grained. Therefore it is privacy preserving.

In accordance with some embodiments, crowd analytics using RF signals comprises two components: collecting radio wavelength signals that encompass information about the environment, and translating these signals into human location heatmaps.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
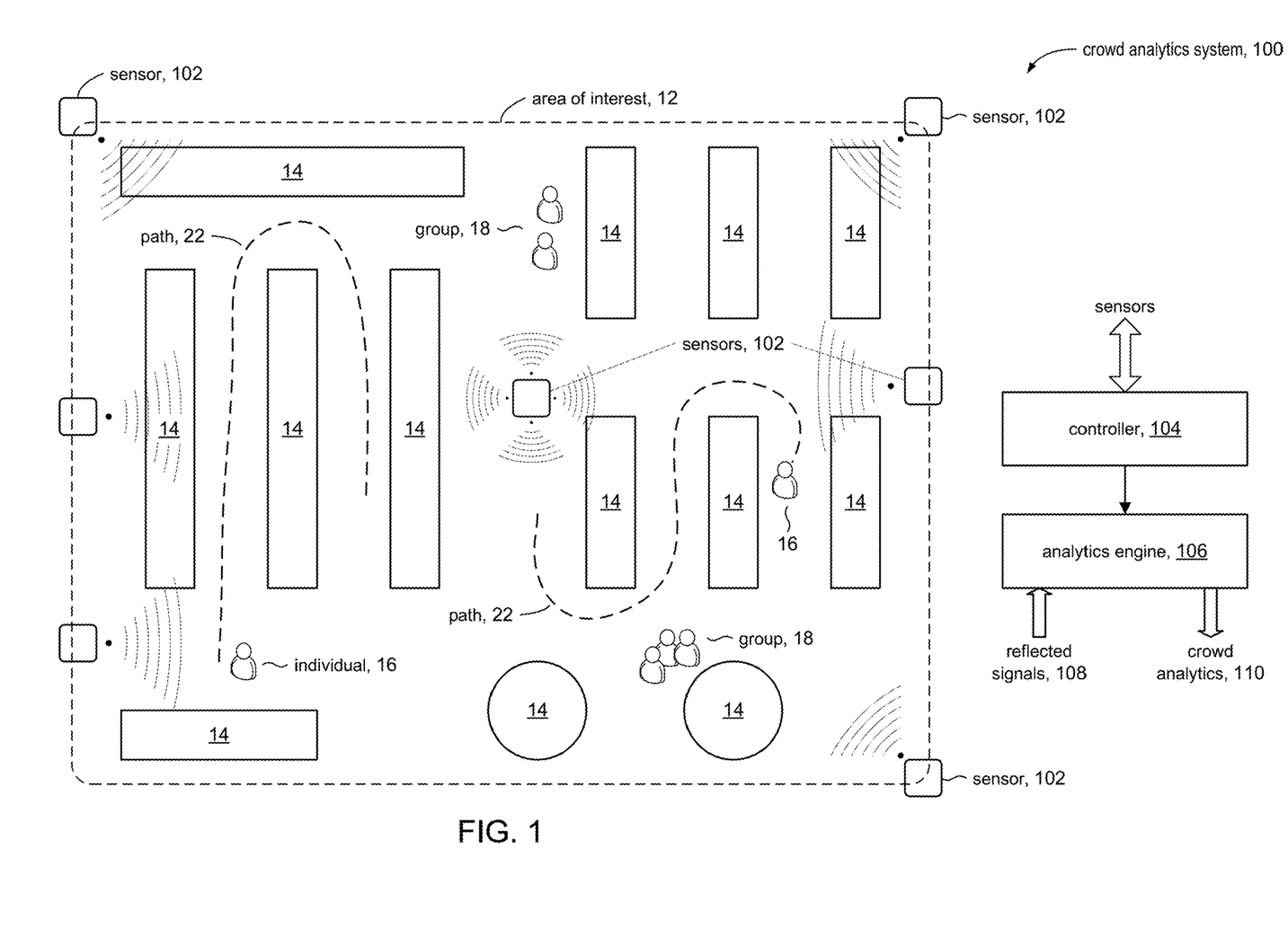
FIG. 1 depicts a simplified block diagram of a system environment according to certain embodiments.

FIG. 1 illustrates an example of a crowd analytics system to monitor and analyze the flow of individuals 16 and groups of individuals 18 in an area of interest 12 in accordance with embodiments of the present disclosure. The area of interest 12 can be characterized as having objects 14 disposed in the area. Individuals 16 move about in the area along paths 22 that are defined or otherwise constrained by objects 14. Groups of individuals 18 can congregate at various locations in area 12, for example, near objects of interest.

Area 12 can be indoors or outdoors. In a retail use case, for example, area 12 can be a store having aisles and displays (objects 14) of merchandise for purchase by customers (individuals 16). Customers may wander about the store, or form clusters (groups 18) at various locations in the store where something has drawn their attention.

System 100 can be deployed on a factory floor to monitor the movement of workers and vehicles. In a smart factory, system 100 can coordinate the movements of automated vehicles with the movements of the factory workers.

Area 12 can be an outdoor mall, where objects 14, such as stores, structures (e.g., benches, planters, fountains, etc.), guest facilities (e.g., help centers, restrooms, etc.), and so on define walking paths 22 and locations where visitors can gather. Another example of area 12 is an amusement park, and so on.

Individuals 16 can be mobile entities other than people moving around in area 12. In some embodiments for example, system 100 can be deployed in a nature preserve (area 12) and individuals 16 can be animals that live in the nature preserve. Paths 22 can be defined based on the trees, rocks, hills and such (objects 14) in the preserve. Groups 18 of animals may indicate colonies animals, animals gathering at a watering hole, or animals grazing in a field, and so on.

System 100 includes sensors 102 deployed in the area of interest 12 to gather information about the area. In some embodiments, for example, sensors 102 can be radio frequency (RF) sensors. Each sensor 12 can include an RF transmitter and an RF receiver. Entities (objects 14 and individuals 16) in area 12 can be detected by transmitting RF signals into the area and detecting signals reflected off of the entities. Each transmitted signal can be encoded with some identifying information in order to distinguish the entities.

The location of entities 14, 16 in area 12 can be determined based on distances of the entities from sensors 102 and directions of the entities relative to the sensors. In some embodiments, sensors 102 can be configured to transmit a frequency-modulated continuous wave (FMCW). FMCW uses a time-varying wave to scan a large frequency bandwidth. In some embodiments, for example, sensors 102 can be configured to operate in the bandwidth between 2 to 4 GHz to provide a distance measurement accuracy in the range 7.5 to 15 cm.

Distance information can be determined from the propagation delay of the reflected signal according to the following:

$$\text{distance} = c \times \text{propagation delay} \times \frac{1}{2}$$

where distance is the distance between a sensor and the object, c is the speed of light, and propagation delay is measured as the time between transmission of a signal and reception of the reflected signal.

Figure 2:
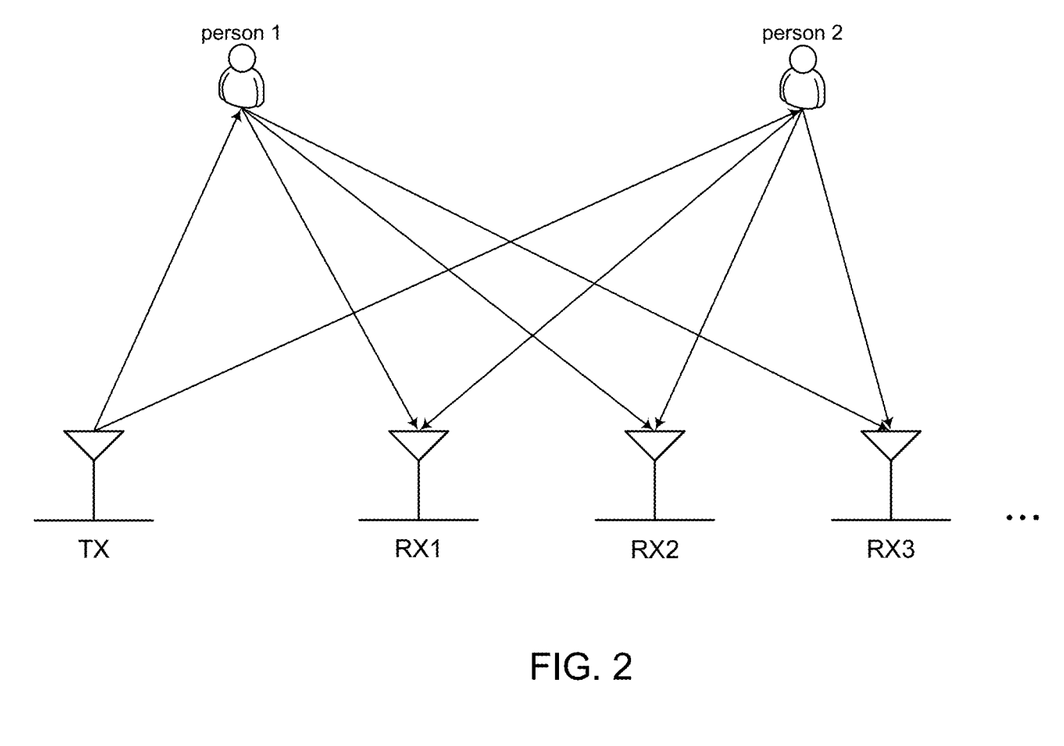
FIG. 2 illustrates the use of multiple receivers to determine direction.

Direction information can be determined by detecting a reflected signal with multiple receivers at different locations in area 12. Referring for a moment to FIG. 2, direction can be determined based on angles from the detected reflections. FIG. 2, for instance, shows a transmitter TX and three receivers RX1, RX2, RX3. Transmitter TX transmits a signal to person 1. A reflected signal can be received by the three receivers. By virtue of the receivers being placed at different locations in area 12, the distance between person 1 and each receiver is different and so the signal reflected from person 1 will arrive at the receivers at different times. These different times of arrival at the receivers can be used to compute a quantity known as the angle of arrival (AoA) of the signal. The AoA values for person 1 can be used to determine their location in area 12, and likewise for person 2. The greater the number of receivers, the better the angular resolution and hence the more accurate will be the direction information. In some embodiments, sensors 102 can act as receivers for each other. In other embodiments, a sensor can be configured with a transmitter and multiple receivers.

System 100 further includes controller 104 to coordinate the operation of sensors 102 to probe the area of interest 12. In some embodiments, for example, controller 104 can communicate with sensors 102 to transmit signals into area 12 and to detect reflections of the transmitted signals (reflected signals) off objects in the area. In some embodiments, controller 104 can control sensors 102 to continuously probe area 12 to capture a set (frames) of reflected signals 108. For example, the sensors can probe the area every n seconds to capture a frame of reflected signals every n seconds.

System 100 further includes analytics engine 106 to receive and process the reflected signals 108 to produce crowd analytics such as number of individuals, their location, traffic patterns, gathering points, etc. This aspect of the present disclosure is discussed in more detail below. Briefly, however, analytics engine 106 can receive frames of reflected signals 108 generated by sensors 102. The reflected signals can be collected directly from the sensors, or indirectly via controller 104, and then provided to analytics engine 106. The reflected signals can be processed by analytics engine 106 in accordance with the present disclosure to provide crowd analytics 110.

Figure 3:
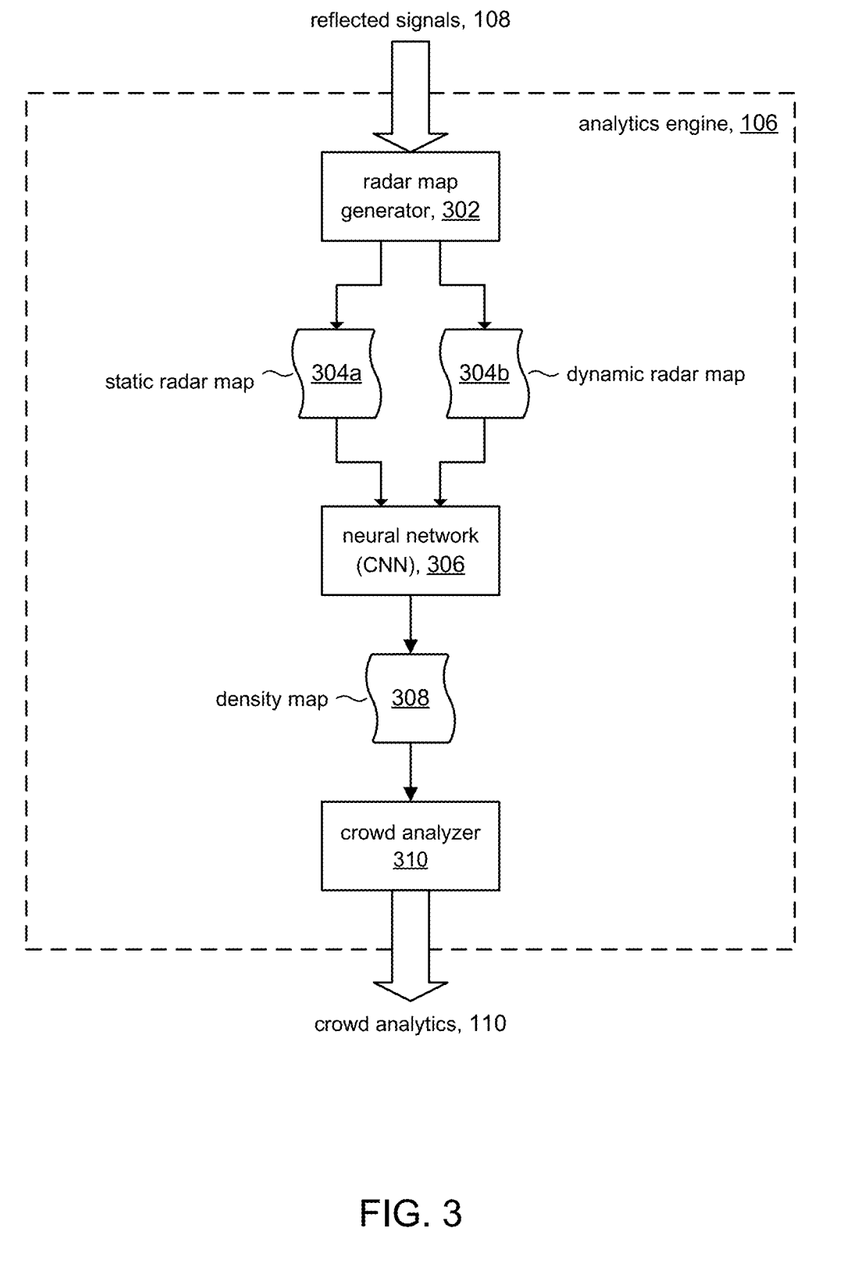
FIG. 3 shows a high level block diagram of an analytics engine in accordance with some embodiments.
Figure 4:
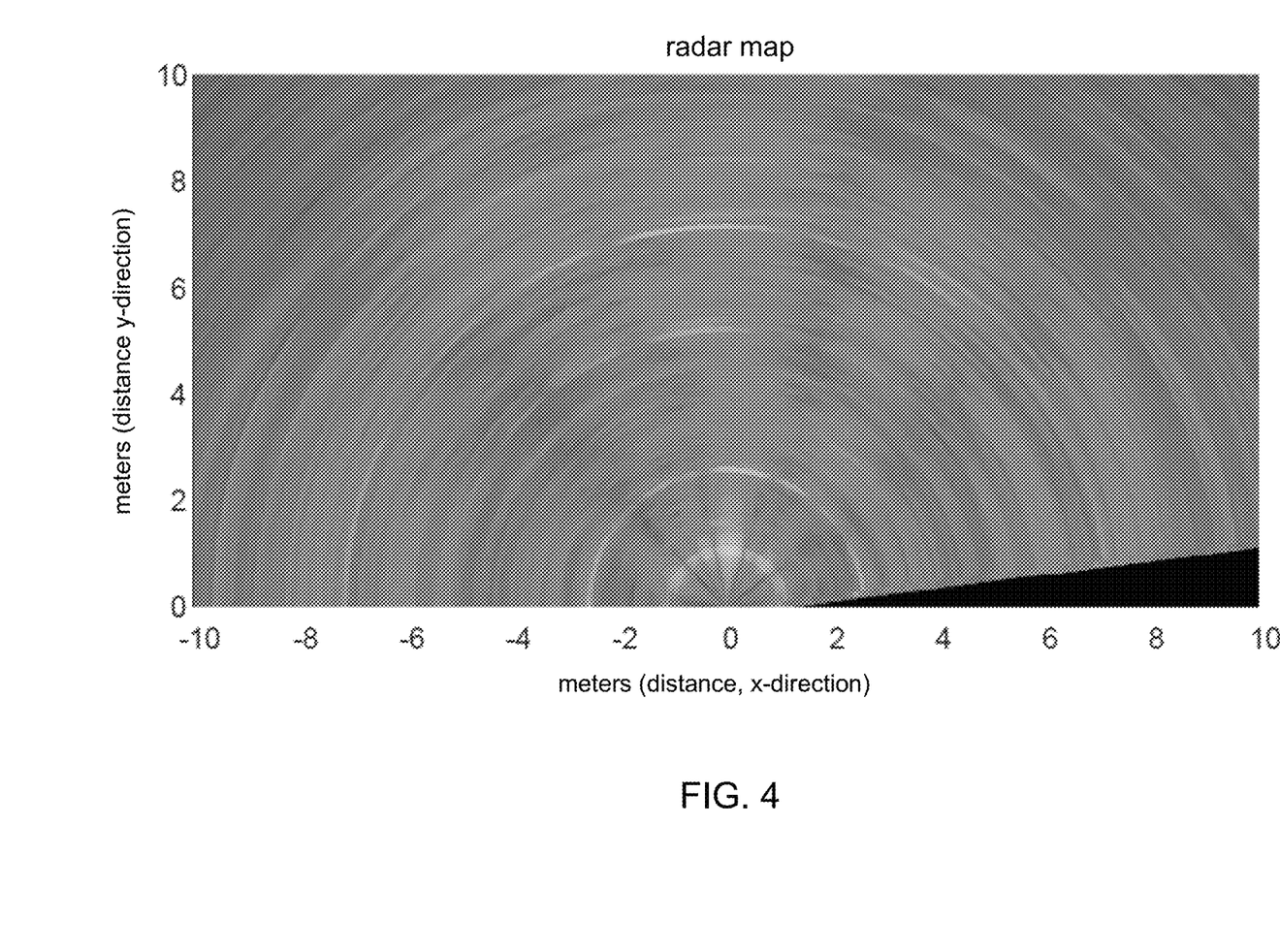
FIG. 4 shows an example of a radar map.

FIG. 3 shows an illustrative configuration of analytics engine 106. In some embodiments, analytics engine 106 can include map generator 302 to generate radar maps 304a, 304b from reflected signals 108. In some embodiments, map generator 302 can generate a static radar map 304a and a dynamic radar map 304b. Referring for a moment to FIG. 4, a radar map can encode distance and AoA information computed from reflected signals obtained by probing the area of interest 12 as described above. The horizontal and vertical axes represent coordinates of the location of objects in front of the radar source (e.g., sensor 102). For example, the horizontal (x) axis indicates distance (e.g., meters) of the object is to the left (negative x-value) of the radar source or the right (positive x-value) of the radar source. The vertical (y) axis indicates how close (e.g., meters) the object is to the radar source. The image brightness of a pixel corresponds to the strength of the reflected signal and indicates the potential (likelihood) of a reflecting object at the location corresponding to the pixel.

Continuing with FIG. 3, in addition to distance information and AoA information, velocity information can be collected from the reflected signals in order to discern moving entities such people from stationary objects such as walls, doors, etc. Velocity can be determined based on the doppler shift between a transmitted signal and its reflected signal; a zero doppler shift indicates a stationary object, while a non-zero doppler shift indicates an object moving about in the area. In some embodiments, static radar map 304a can be computed from reflected signals 108 that have zero doppler shift. For example, static radar map 304a represents signals reflected from static objects in area 12; e.g., walls, furniture, structures, trees, etc. On the other hand, dynamic radar map 304b can be computed from reflected signals 108 that have non-zero doppler shift.

On the other hand, dynamic radar map 304b can be computed from reflected signals 108 that have non-zero doppler shift (i.e., non-zero velocity. More particularly, dynamic radar map 304b represents a radar map for a given Doppler shift. In accordance with the present disclosure, a dynamic radar map can be obtained for each Doppler shift (velocity) of interest; e.g., a map can be obtained for objects moving a 1 meter per second (m/s), another map for objects moving at 1.5 m/s, another for objects moving at 2 m/s, and so on. For example, a pixel with coordinates x, y in a dynamic radar map that represents objects moving at v m/s represents a potential object at location x meters to the right or left of the radar source and y meters distance from the radar source moving at velocity v m/s. The brightness (intensity) of the pixel indicates the likelihood that the pixel represents a moving object.

Reflected signals typically include artifacts such as secondary multipath reflections and radar sidelobes. Accordingly, these artifacts are represented in the radar maps 304a, 304b and can affect the accuracy of crowd analytics 110 based on the radar maps. Multipath reflections arise when a transmitted signal reflects off a target object (e.g., an individual) and then reflects off other objects in the area (e.g., other individuals, static objects). Multipath reflections can lead to erroneous identification of objects by appearing as distinct reflections. Sidelobes refer to portions of the radiation pattern of a transmitted signal other than the main lobe. The main lobe of a transmitted signal contains the highest power, while sidelobes contain lower power. Reflections from sidelobes can appear as coming from reflectors that are not really there. These extraneous reflections can produce inaccurate AoA computations, resulting in incorrect direction information.

In some embodiments, radar maps 304a, 304b can be processed by neural network 306 to eliminate or at least reduce the influence of multipath and sidelobe artifacts on determining distance and direction. In some embodiments, neural network 306 can be a convolutional neural network (CNN), although it will be understood that other neural network architectures can be used, for example, recursive neural networks.

Figure 5:
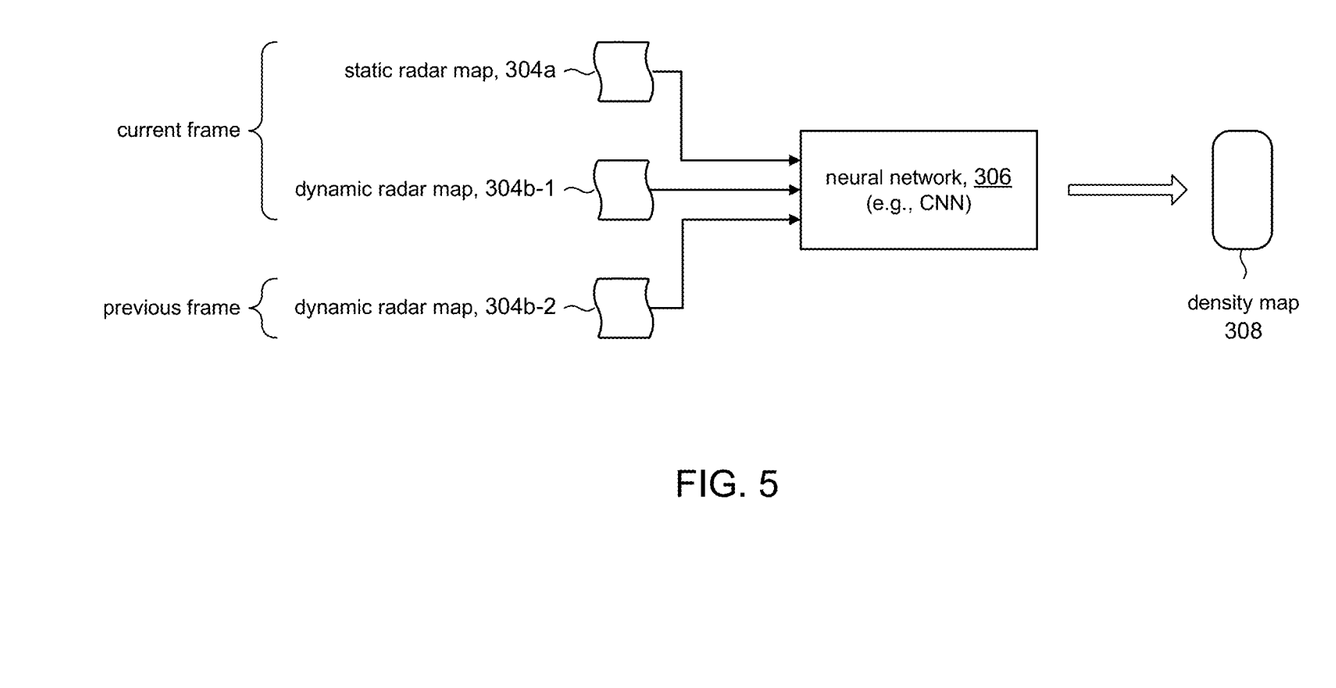
FIG. 5 depicts a simplified block diagram of producing a density map using a neutral network according to certain embodiments.

Neural network 306 can be trained in accordance with the present disclosure to account for multipath and sidelobe influence to produce an accurate density map 308. The density map is similar to a radar map, except that the density map shows locations of individuals rather than signal reflections. The density map can represent individuals 16 in the probed area, groups of individuals in the area, and so on. Referring for a moment to FIG. 5, the figure shows an example of producing a density map 308 based on a frame of reflected signals from a probe of area 12. In some embodiments, a static radar map 304a and a dynamic radar map 304b-1 can be generated from a given (current) frame of reflected signals. In order to provide time-related information to the neural network, radar maps 304a, 340b-1 can be input to neural network 306 along with a dynamic radar map 304b-2 from a previous frame of reflected signals to produce density map 308.

Continuing with FIG. 3, crowd analyzer 310 can analyze density map 308 to identify objects and individuals in the probed area. Crowd analyzer 310 can perform various analytics such as identifying traffic patterns in the area, variations in traffic pattern over time (e.g., during the day, during the week, etc.), identifying where individuals are spending their time, identifying groups of individuals, identify locations where individuals and groups linger, and so on. In some embodiments, a series of frames of reflected signals 108 can be provided to analytics engine 106 to produce a series of dynamic maps 308 to show movement of individuals 16 in area 12 over time. The specific kinds of analytics will vary depending on the nature of the area being probed; e.g., retail store, shopping mall, outdoor park, work area, nature preserve, etc.

Figure 6A:
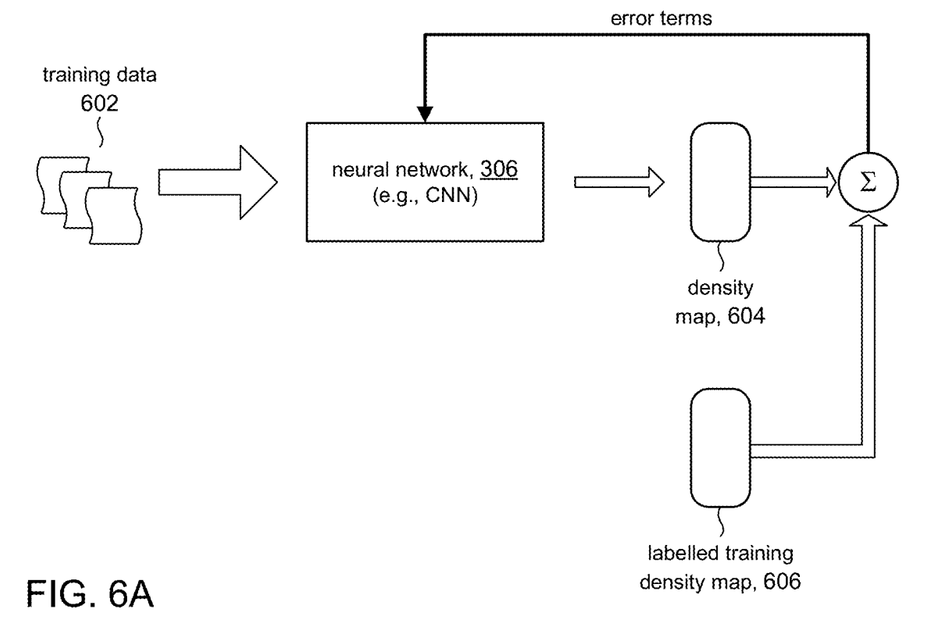
FIGS. 6A, 6B depict training a neural network in accordance with some embodiments.
Figure 6B:
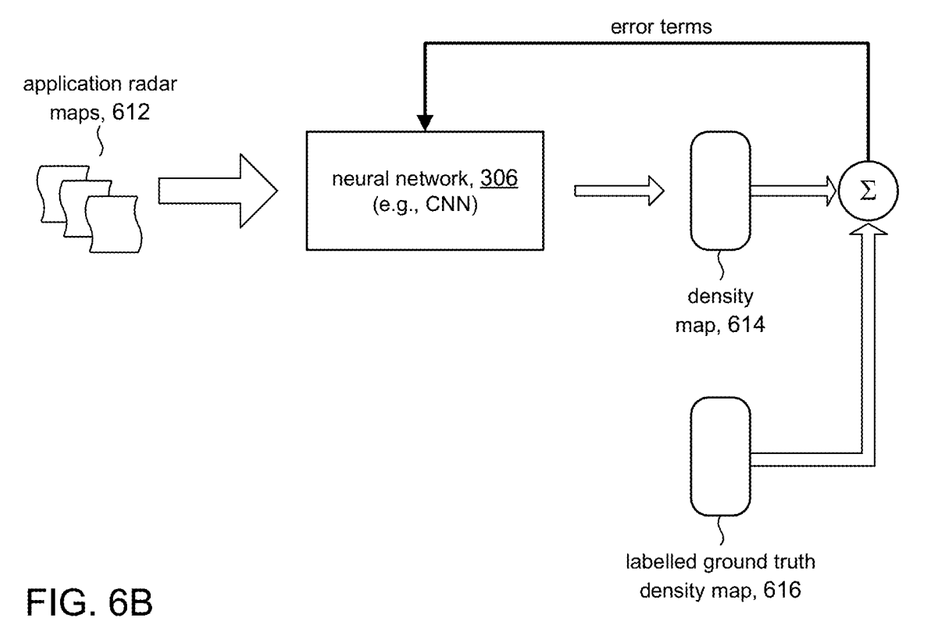

Referring to FIGS. 6A, 6B, the discussion will now turn to training of neural network 306 in accordance with the present disclosure. The neural network can be trained on known data in a controlled environment and then fine-tuned at a live site. The figures illustrate a two-step process for training the neural network: initial training (FIG. 6A) and transfer learning (FIG. 6B).

FIG. 6A illustrates initial training of neural network 306 using training data 602. The training date can be obtained by probing a training site (not shown) and generating radar maps of the training site. Training neural networks is known. Briefly, in some embodiments for example, a set of training data 602 can include static and dynamic radar maps obtained from a given frame of reflected signals by probing the training site. The training data can further include a dynamic radar map from a frame of reflected signals from an earlier probe of the training site. The training data set is provided to the neural network to produce density map 604. The density map 604 is compared against a labelled density map 606 to produce error terms (cost). The error terms can be fed back to the neural network to adjust the values of the weighting and bias parameters that comprise neural network 306. The process can be repeated with additional pairs of training data 602 and labelled density maps 606 to arrive at an initial set of values of neural network parameters.

FIG. 6B illustrates fine tuning of the neural network parameters by a process referred to as transfer learning. Transfer learning in accordance with the present disclosure includes training data that comprises radar maps 612 made by probing the actual domain within which the neutral network will be deployed, namely area of interest 12. The labelled density map 616 is a density map that represents features of known objects in the area such as structures, walking paths, etc., referred to as "ground truth."

Figure 7:
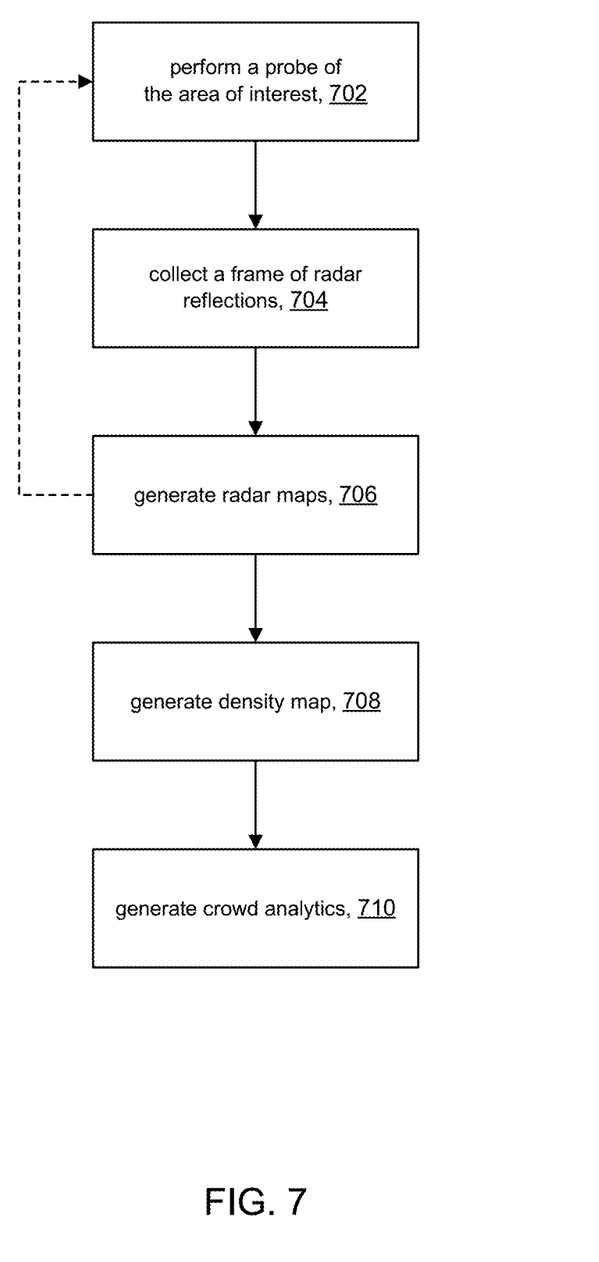
FIG. 7 shows a high level flow of operations to produce a density map using a neutral network according to certain embodiments.

Referring to FIG. 7, the discussion will now turn to a high level description of operations of system 100 in accordance with the present disclosure, and in particular controller 104 and analytics engine 106. In some embodiments, for example, controller 104 and analytics engine 106 can include a processor (e.g., 1002, FIG. 10) and computer executable program code, which when executed by the processor can cause the computer system to perform operations in accordance with FIG. 7. The flow of operations performed by the computer system is not necessarily limited to the order of operations shown.

At operation 702, the controller can perform a probe operation in the area of interest. In some embodiments, for example, each sensor 102 in area 12 can transmit a signal into area 12 and detect reflections of its transmitted signal.

At operation 704, the controller can receive a suitable digitized representation of the reflected signals from sensors 102 as a collection of reflected signals, referred to as a frame. The controller can provide the frame of reflected signals to the analytics engine. In some embodiments, the analytic engine itself can collect the reflected signals directly from the sensors 102.

At operation 706, the analytics engine can generate radar maps from each frame of reflected signals. In accordance with some embodiments, a static radar map 304a can be computed from the frame of reflected signals. More specifically, the static radar map can be computed from reflected signals that exhibit substantially zero doppler shift, indicating that those signals were reflected off of stationary objects. Likewise, a dynamic radar map 304b can be computed from the frame of reflected signals. More specifically, the dynamic radar map can be computed from reflected signals that exhibit non-zero doppler shift, indicating that those signals were reflected off of moving objects. The computations for producing radar maps are known and well understood. Briefly, the original data from the radar forms a 3-dimensional array of radar chirp signals. The first dimension are samples from the same chirp signal, the second dimension are chirp signals from the same block, and the third dimension are signals from multiple transmitter-receiver antenna pairs. These three dimensions of data can be translated using a fast-Fourier transform (FFT) operation into range, doppler, and AoA data respectively. By picking out the doppler dimension, each clip is a 2-dimension map of range and AoA, which are expressed in polar coordinates.

The polar coordinates can be converted into Cartesian coordinates to produce maps such as the one shown in FIG. 4.

The frame of reflected signals and the corresponding radar maps represent the state of objects in area 12 at an instant in time. Movement in area 12 can be detected by looking at a series of dynamic radar maps generated from successive frames. Operations 702, 704, and 706 can be repeatedly performed in order to capture activity in area 12. In some embodiments, for example, operations 702, 704, and 706 can be periodically performed (e.g., every n seconds) to capture a sequence of dynamic radar maps.

At operation 708, the analytics engine can generate a density map from the radar maps. In accordance with some embodiments, the radar maps can be processed by a neural network as described in connection with FIG. 5. The density map can represent the spatial distribution of individuals in a given frame, and such distribution information is useful in many applications. For example, if the density in a small region of area 12 is much higher than that in other regions, it may indicate something interesting is happening there. The location of each individual in the density map is a Gaussian distribution summing to 1. Thus, the sum of the whole density map equals the number of individuals in the area of interest.

At operation 710, the analytics engine can generate suitable analytics 110 from the density map 308.

Figure 8:
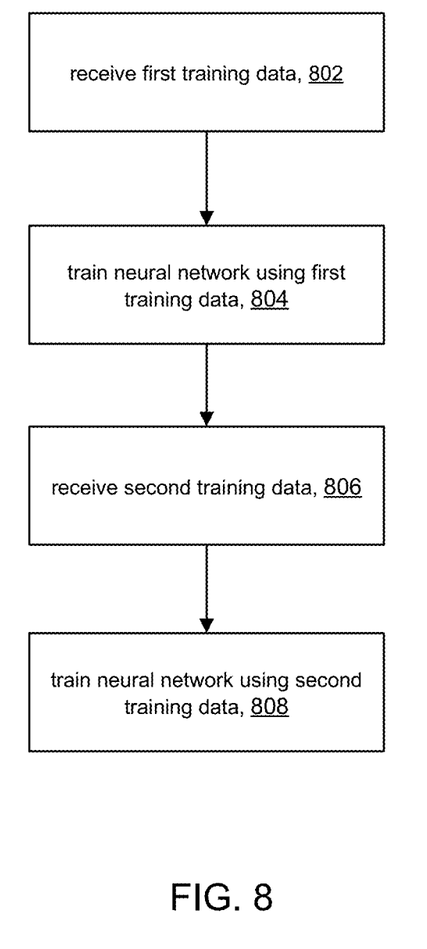
FIG. 8 shows a high level flow of operations to train a neutral network according to certain embodiments

Referring to FIG. 8, the discussion will now turn to a high level description of operations in analytics engine 106 to train a neural network (e.g., 306) in accordance with the present disclosure. It will be appreciated that training the neural network can occur other than in the analytic engine. In some embodiments, the analytics engine can include a processor (e.g., 1002, FIG. 10) and computer executable program code, which when executed by the processor can cause the computer system to perform operations in accordance with FIG. 8. The flow of operations performed by the computer system is not necessarily limited to the order of operations shown.

At operation 802, the analytics engine can receive initial training data. In some embodiments, for example, training data can be generated by probing a training site to obtain radar maps of the training site, including static radar maps and dynamic radar maps. The training data can include a labelled density map that identifies known objects in the training site.

At operation 804, the analytics engine can apply the training data to perform an initial training of the neural network. In some embodiments, the neural network can be a convolutional neural network (CNN), although it will be appreciated that other architectures can be used such as a recursive neural network. Referring to FIG. 6A, for a moment, generally the weighting and biasing parameters of the nodes comprising a neural network are initially set to random values. Radar maps from the training data are applied to the neural network to produce a density map. The output is compared to a labelled density map corresponding to the input radar maps to produce error terms. The error terms are then fed back to the neural network (e.g., using backpropagation techniques) which causes the parameters to be adjusted. The process it-is repeated with different radar maps and labelled density map. After some number of iterations, the neural network is in an initial trained state.

At operation 806, the analytics engine can receive a second set of training data. Because the neural network is initially trained on a training site, the neural network may not too well in the actual target location. Accordingly, transfer learning can be applied to fine tune the parameters of the neural network to the actual target location. Target learning uses as the starting point the parameter values obtained from the training stage. In accordance with the present disclosure, training data for transfer learning comprises radar images of the target location and labelled density maps of the target location. The labelled density map can be labeled using ground truth knowledge about the target location. Other ways to label the density map include asking subjects to walk along fixed trajectories in the training site (e.g., employees in a grocery store walking along fixed paths while restocking items), placing cameras during the installation process (say for one day) and using images captured by the cameras to manually identify where people are and using those as metrics of density, and so on.

At operation 808, the analytics engine can train the neural network using the second training data in same manner as described above at operation 804.

Figure 9:
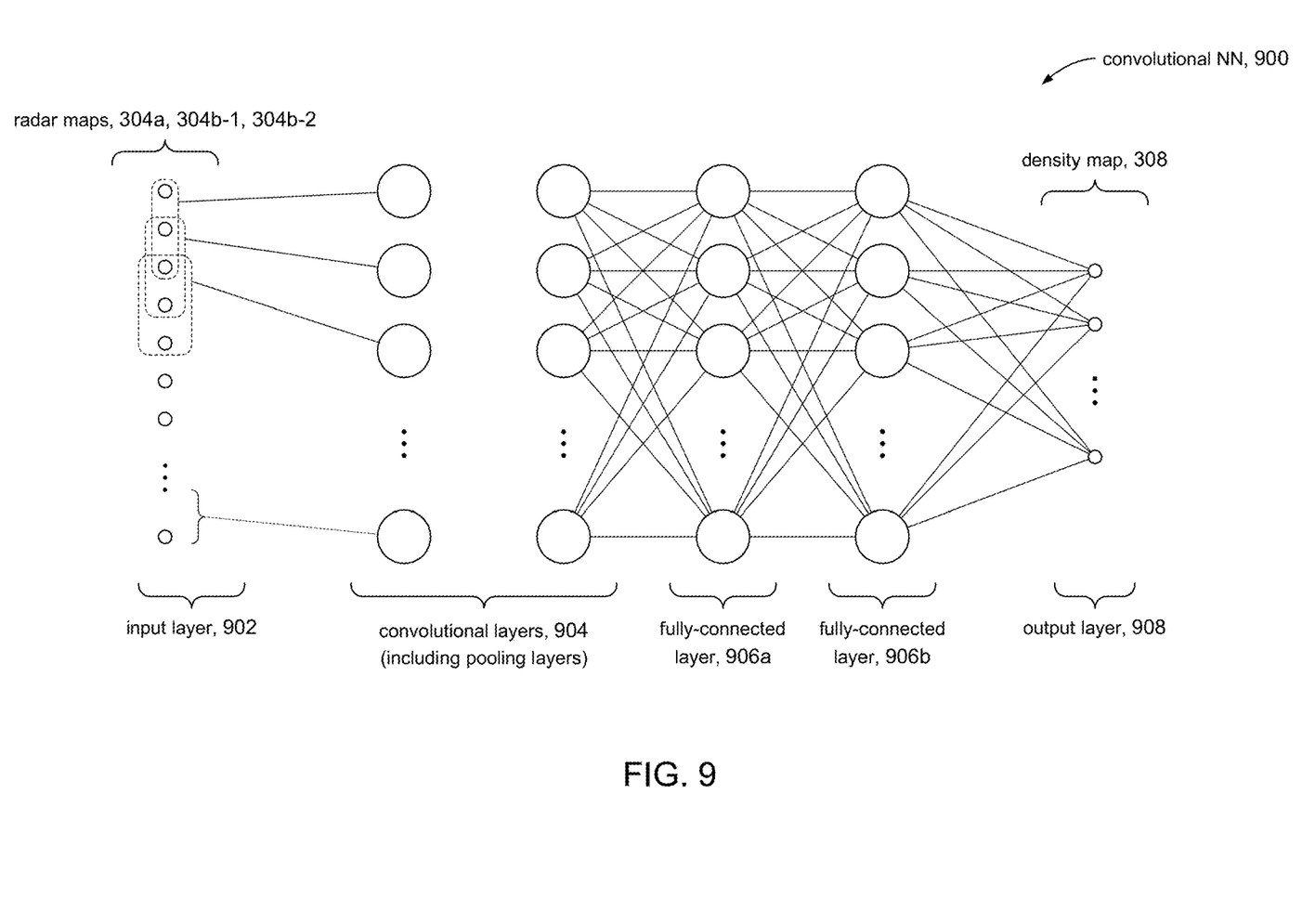
FIG. 9 shows an example of a convolutional neural network.

FIG. 9 shows an example of a convolutional neural network (CNN) 900 that can be used in the present disclosure. The CNN includes one or more convolutional layers 904. Each convolutional layer may include a pooling layer (not shown). The output end of the CNN can include one or more fully connected layers 906a, 906b. In accordance with some embodiments, the nodes of the input layer 902 can comprise pixels from the radar maps, e.g., a static radar map and a dynamic radar map from a current frame, and a dynamic radar map from a previous frame. The nodes of the output layer 908 can comprise the pixels of a density map; see FIG. 5, for example.

Nodes in one convolutional layer sample overlapping subsets of the nodes in the previous layer. An example of this overlapped sampling by a convolutional layer is illustrated in FIG. 9 between input layer 902 and the first convolutional layer 904. Although not shown in FIG. 9, the pooling layer associated with a convolutional layer (e.g., 904) combines subsets of nodes of the associated convolutional layer. For example, the first node in a pooling layer may combine (e.g., by computing an average) the weights of the first n nodes of the corresponding convolutional layer. The second node in the pooling layer may combine the next n nodes of the corresponding convolutional layer, and so on. The convolutional layer that follows the pooling layer will then do overlapped sampling on the pooling layer, and so on. For the fully connected layers 906a, 906b, each node combines every node on the previous layer; hence "fully" connected.

The initial training of a CCN sets the weighting and biasing parameters of all nodes comprising the CNN. Transfer learning, largely focuses on fine tuning the parameters in the fully connected layers. Depending on the learning mechanism (e.g., backpropagation), however, transfer learning may fine tune some of the nodes in the convolutional layers as well.

Figure 10:
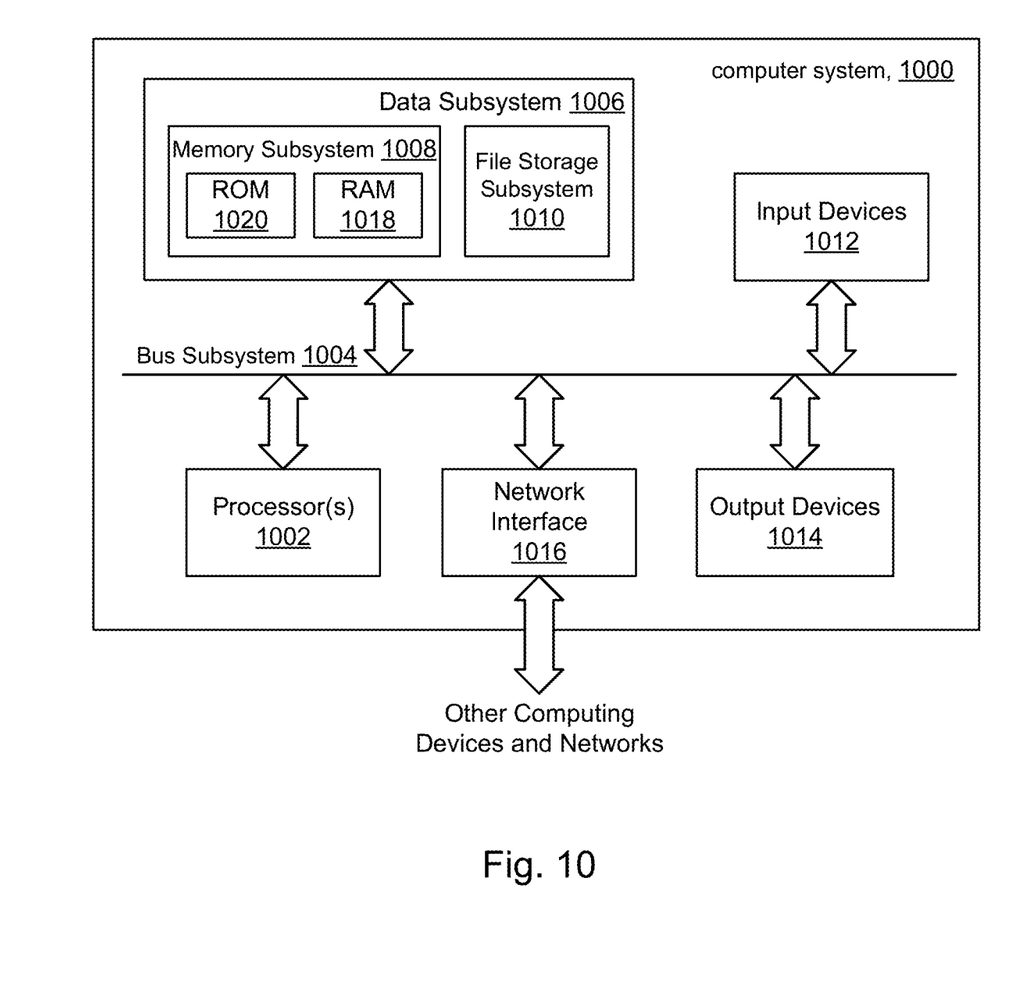
FIG. 10 shows an illustrative computing system adapted in accordance with the present disclosure.

FIG. 10 depicts a simplified block diagram of an example computer system 1000 according to certain embodiments. Computer system 1000 can be used to implement controller 104 (FIG. 1) and analytics engine 106 described in the present disclosure. As shown in FIG. 10, computer system 1000 can include one or more processors 1002 that communicate with a number of peripheral devices via bus subsystem 1004. These peripheral devices include data subsystem 1006 (comprising memory subsystem 1008 and file storage subsystem 1010), user interface input devices 1012, user interface output devices 1014, and network interface subsystem 1016.

Bus subsystem 1004 can provide a mechanism that enables the various components and subsystems of computer system 1000 to communicate with each other as intended. Although bus subsystem 1004 is shown schematically as a single bus, alternative embodiments of the bus subsystem can utilize multiple busses.

Network interface subsystem 1016 can serve as an interface for communicating data between computer system 1000 and other computer systems or networks.

User interface input devices 1012 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 1000.

User interface output devices 1014 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 1000.

Data subsystem 1006 includes memory subsystem 1008 and file/disk storage subsystem 1010 represent non-transitory computer-readable storage media that can store program code and/or data, which when executed by processor 1002, can cause processor 1002 to perform operations in accordance with embodiments of the present disclosure.

Memory subsystem 1008 includes a number of memories including main random access memory (RAM) 1018 for storage of instructions and data during program execution and read-only memory (ROM) 1020 in which fixed instructions are stored. File storage subsystem 1010 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1000 is illustrative and many other configurations having more or fewer components than system 1000 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A system comprising:
   one or more computer processors; and
   a computer-readable storage medium comprising instructions that control the one or more computer processors to:
      probe an area of interest with a plurality of radio frequency (RF) signals transmitted by a plurality of sensors deployed about the area of interest;
      generate a plurality of radar maps based at least on reflected signals comprising reflections of the transmitted signals that reflect off objects in the area of interest, wherein the objects in the area of interest comprise one or more static objects that are stationary within the area of interest and one or more moving objects that are moving about in the area of interest, wherein the plurality of radar maps includes static radar maps based on reflected signals that do not exhibit a doppler shift and dynamic radar maps based on reflected signals that exhibit a doppler shift wherein the stat far maps represent signals reflected from the static objects that are stationary within the area of interest, and wherein the dynamic radar maps represent signals reflected from the moving objects that are moving about in the area of interest;
      provide the static radar maps and the dynamic radar maps as input to a neural network to generate a plurality of density maps, wherein the neural network is trained using first training data representative of a training site to develop a first set of parameter values for parameters of the neural network, wherein the neural network is subsequently trained for the area of interest using second training data representative of the area of interest to fine tune the first set of parameter values to develop a second set of parameter values for the parameters of the neural network for the area of interest used for generating the plurality of density maps, wherein the training site and the area of interest are different geographic areas, and wherein the density maps represent distributions of likely locations of individuals within the area of interest; and
      identify traffic patterns of the individuals in the area of interest and locations of groups of the individuals in the area of interest using the plurality of density maps.

2. The system of claim 1, wherein the first training data comprises radar maps that are generated based on a probe of the training site.

3. The system of claim 1, wherein the second training data comprises radar maps that are generated based on a probe of the area of interest.

4. The system of claim 1, wherein each radar map represents distances from and directions to objects in the area of interest relative to the plurality of sensors.

5. The system of claim 1, wherein a density map is generated from (1) static and dynamic radar maps based on reflected signals resulting from a probe of the area or interest at a first time and (2) a dynamic radar map based on reflected signals resulting from a probe of the area of interest at a time prior to the first time.

6. The system of claim 1, wherein the neural network is a convolutional neural network.

7. A method comprising:
probing an area of interest with a plurality of radio frequency (RF) signals transmitted by a plurality of sensors deployed about the area of interest;
generating a plurality of radar maps based at least on reflected signals comprising reflections of the transmitted signals that reflect off objects in the area of interest, wherein the objects in the area of interest comprise one or more static objects that are stationary within the area of interest and one or more moving objects that are moving about in the area of interest, wherein the plurality of radar maps includes static radar maps based on reflected signals that do not exhibit a doppler shift and dynamic radar maps based on reflected signals that exhibit a doppler shift, wherein the static radar maps represent signals reflected from the static objects that are stationary within the area of interest, and wherein the dynamic radar maps represent signals reflected from the moving object hat are moving about in the area of interest;
providing the static radar maps and the dynamic radar maps as input to a neural network to generate a plurality of density maps, wherein the neural network is trained using first training data representative of a training site to develop a first set of parameter values for parameters of the neural network, wherein the neural network is subsequently trained for the area of interest using second training data representative of the area of interest to fine tune the first set of parameter values to develop a second set of parameter values for the parameters of the neural network for the area of interest used for generating the plurality of density maps, wherein the training site and the area of interest are different geographic areas, and wherein the density maps represent distributions of likely locations of individuals within the area of interest; and
identifying traffic patterns of the individuals in the area of interest and locations of groups of the individuals in the area of interest using the plurality of density maps.

8. The method of claim 7, wherein the first training data comprises radar maps that are generated based on a probe of the training site.

9. The method of claim 7, wherein the second training data comprises radar maps that are generated based on a probe of the area of interest.

10. The method of claim 7, wherein each radar map represents distances from and directions to objects in the area of interest relative to the plurality of sensors.

11. The method of claim 7, wherein a density map is generated from (1) static and dynamic radar maps based on reflected signals resulting from a probe of the area or interest at a first time and (2) a dynamic radar map based on reflected signals resulting from a probe of the area of interest at a time prior to the first time.

12. The method of claim 7, wherein the neural network is a convolutional neural network.

13. A computer-readable storage medium having stored thereon computer executable instructions, which when executed by a computer device, cause the computer device to:

probe an area of interest with a plurality of radio frequency (RF) signals transmitted by a plurality of sensors deployed about the area of interest;
generate a plurality of radar maps based at least on reflected signals comprising reflections of the transmitted signals that reflect off objects in the area of interest, wherein the objects in the area of interest comprise one or more static objects that are stationary within the area of interest and one or more moving objects that are moving about in the area of interest wherein the plurality of radar maps includes static radar maps based on reflected signals that do not exhibit a doppler shift and dynamic radar maps based on reflected signals that exhibit a doppler shift, wherein the static radar maps represent signals reflected from the static objects that are stationary within the area of interest, and w in radar maps represent signals reflected from the moving objects that are moving about in the area of interest;
provide the static radar maps and the dynamic radar maps as input to a neural network to generate a plurality of density maps, wherein the neural network is trained using first training data representative of a training site to develop a first set of parameter values for parameters of the neural network, wherein the neural network is subsequently trained for the area of interest using second training data representative of the area of interest to fine tune the first set of parameter values to develop a second set of parameter values for the parameters of the neural network for the area of interest used for generating the plurality of density maps wherein the training site and the area of interest are different geographic areas, and wherein the density maps represent distributions of likely locations of individuals within the area of interest; and
identify traffic patterns of the individuals in the area of interest and locations of groups of the individuals in the area of interest using the plurality of density maps.

14. The computer-readable storage medium of claim 13, wherein the first training data comprises radar maps that are generated based on a probe of the training site.

15. The computer-readable storage medium of claim 13, wherein the second training data comprises radar maps that are generated based on a probe of the area of interest.

16. The computer-readable storage medium of claim 13, wherein each radar map represents distances from and directions to objects in the area of interest relative to the plurality of sensors.

17. The computer-readable storage medium of claim 13, wherein a density map is generated from (1) static and dynamic radar maps based on reflected signals resulting from a probe of the area or interest at a first time and (2) a dynamic radar map based on reflected signals resulting from a probe of the area of interest at a time prior to the first time.

18. The system of claim 1, wherein a distribution of likely locations of an individual within the area of interest is a Gaussian distribution summing to 1.

19. The system of claim 1, wherein the individuals are mobile entities that are movable within the area of interest.

20. The system of claim 1, wherein the neural network is trained to reduce errors that arise from multipath and sidelobe artifacts in reflected signals represented in radar maps.

* * * * *